United States Patent
Chan et al.

(10) Patent No.: US 10,909,633 B1
(45) Date of Patent: *Feb. 2, 2021

(54) SYSTEMS AND METHODS FOR WEATHER-RELATED VEHICLE DAMAGE PREVENTION

(71) Applicant: State Farm Mutual Automobile Insurance Company, Bloomington, IL (US)

(72) Inventors: Aaron Chan, Bloomington, IL (US); Christina P Mullen, Bloomington, IL (US); Rosemarie Grant, Bloomington, IL (US); John Nepomuceno, Bloomington, IL (US); Cynthia L Garretson, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/419,162

(22) Filed: May 22, 2019

Related U.S. Application Data

(63) Continuation of application No. 15/133,843, filed on Apr. 20, 2016, now Pat. No. 10,354,334.

(60) Provisional application No. 62/214,674, filed on Sep. 4, 2015.

(51) Int. Cl.
  *G06Q 40/00* (2012.01)
  *G06Q 40/08* (2012.01)
  *G08G 1/14* (2006.01)

(52) U.S. Cl.
  CPC ............. *G06Q 40/08* (2013.01); *G08G 1/149* (2013.01)

(58) Field of Classification Search
  CPC ...................................................... G06Q 40/08
  USPC .......................................................... 705/4
  See application file for complete search history.

(56) References Cited

U.S. PATENT DOCUMENTS

| | | | |
|---|---|---|---|
| 5,895,169 A | * | 4/1999 | Holm .................. E01F 9/685 248/156 |
| 8,223,010 B2 | | 7/2012 | Petite et al. |
| 9,159,080 B2 | | 10/2015 | Fiorucci et al. |
| 9,248,823 B2 | | 2/2016 | MacNeille et al. |

(Continued)

OTHER PUBLICATIONS

Bell, Mark; "Wintry weather may curb travel", The Daily News Journal; Murfeesboro, Tenn. Dec. 23, 2010 (Year: 2010).*

(Continued)

*Primary Examiner* — Edward Chang
(74) *Attorney, Agent, or Firm* — Armstrong Teasdale LLP

(57) ABSTRACT

An insurance computing device is provided. The insurance computing device may include a processor and a memory. The processor may be programmed to receive a registration request from a vehicle computing device associated with a vehicle and/or a covered parking location (CPL) computing device associated with a covered parking location, generate a usage profile associated with at least one of the vehicle and the covered parking location, monitor the vehicle computing device and/or the CPL computing device for any requests to reserve an available parking spot of the covered parking location, update the usage profile, determine if an insurance policy associated with the vehicle and/or the covered parking location is eligible for insurance-related benefits based upon the usage profile.

20 Claims, 8 Drawing Sheets

(56) References Cited

U.S. PATENT DOCUMENTS

| | | |
|---|---|---|
| 9,275,392 B2 | 3/2016 | Potkonjak |
| 2006/0212344 A1 | 9/2006 | Marcus et al. |
| 2009/0204319 A1 | 8/2009 | Shanbhag et al. |
| 2010/0191584 A1 | 7/2010 | Fraser et al. |
| 2013/0265174 A1* | 10/2013 | Scofield ........... G08G 1/096883 340/932.2 |
| 2014/0143061 A1 | 5/2014 | Abhyanker |
| 2014/0309855 A1* | 10/2014 | Tran ........................ B60Q 1/38 701/36 |
| 2015/0294431 A1 | 10/2015 | Fiorucci et al. |

OTHER PUBLICATIONS

Bell, Mark; "Wintry weather may curb travel," The Daily News Journal; Murfreesboro, Tenn. Dec. 23, 2010.

Schatz, Amy; "Getting grip on the tablet PCs; 2 Austin companies hope to become leaders in the small but growing market"; Austin American Statesman; Dec. 2003.

* cited by examiner

SYSTEMS AND METHODS FOR WEATHER-RELATED VEHICLE DAMAGE PREVENTION

CROSS-REFERENCE TO RELATED APPLICATIONS

This application is a continuation of, and claims the benefit of, U.S. patent application Ser. No. 15/133,843, filed Apr. 20, 2016 and entitled "Systems and Methods for Weather-related Vehicle Damage Prevention," which claims the benefit of priority of U.S. Provisional Patent Application Ser. No. 62/214,674, filed Sep. 4, 2015, the contents of both are hereby incorporated by reference, in their entireties and for all purposes, herein.

FIELD OF THE INVENTION

The present disclosure relates to weather-related vehicle damage prevention and, more particularly, to systems and methods for identifying inclement weather and locating covered parking for vehicles.

BACKGROUND

Weather conditions, such as hail, may cause damage to infrastructure and vehicles in an effected area. In particular, vehicles may be in an uncovered location (e.g., a road, a driveway, or an uncovered parking lot) that may increase the risk of damage caused by weather conditions. Damage to a vehicle may reduce the value of the vehicle, result in replacement costs for parts (e.g., broken windows), and/or increases insurance costs. Some vehicles may be substantial investments for vehicle owners, and therefore it may be desired to prevent damage to the vehicles. To reduce the risk of vehicle damage from weather conditions, a vehicle owner may park his or her vehicle in a covered location. A covered location may include, for example, a garage, a covered public parking lot, and/or another location with overhead protection.

However, some vehicle owners may not have access to a covered location. For example, a vehicle owner living in an apartment building may only have access to street parking in close proximity to the apartment building. Moreover, some vehicle owners may not be aware of a covered location. In one example, a vehicle owner may not be aware that a nearby parking garage with restricted access during business hours is available for public parking outside of business hours.

In addition, many vehicle owners may not be able to predict weather conditions that may cause vehicle damage, e.g., hail. Some vehicle owners may not be aware of a damaging weather condition until the weather condition occurs. If a vehicle owner attempts to move his or her vehicle to a covered location, the vehicle may still be damaged. In the event of weather conditions such as hail, the vehicle owner may risk being injured while moving the vehicle.

BRIEF SUMMARY

The present embodiments may relate to a vehicle weather damage-prevention system. The system may include a vehicle computing device associated with a vehicle, a covered parking location (CPL) computing device associated with a covered parking location, and an insurance computing device. The vehicle computing device may receive weather data and determine whether the vehicle is affected by inclement weather, such as hail, snow, fog, ice, lightning, wildfires, floods, and/or rain. The vehicle computing device may receive a location identifier for the covered parking location and a communication address to contact the CPL computing device. The vehicle computing device may receive information from the CPL computing device indicating whether the covered parking location has available parking spots. The vehicle computing device may transmit a request to the CPL computing device to reserve a parking spot in addition to a vehicle user profile and payment information if necessary. The vehicle user profile includes information regarding the vehicle and/or a vehicle user of the vehicle. The CPL computing device may selectively permit the vehicle access to the covered parking location. In some embodiments, the CPL computing device may be in communication with an access terminal and/or a barricade of the covered parking location to selectively permit the vehicle access. The insurance computing device may monitor the vehicle computing device and/or the CPL computing device and determine if an insurance policy is eligible for insurance-related benefits based upon a usage profile associated with a policyholder of the vehicle or the covered parking location. The usage profile indicates how often the vehicle computing device and/or the CPL computing device use the vehicle weather damage-prevention system during inclement weather.

In one aspect, a vehicle computing device associated with a vehicle may be provided. The vehicle computing device may include a processor and a memory. The processor may be programmed to receive weather data that may include current weather data and/or predicted weather data of a region that includes the vehicle. The processor may be further programmed to determine from the weather data that the region will experience inclement weather within a period of time and/or identify a covered parking location that includes an available parking spot. The processor may also be programmed to transmit a request to reserve the available parking spot to a covered parking location (CPL) computing device and/or receive permission to access the covered parking location. The vehicle computing device may include additional, less, or alternate functionality and components, including those described herein.

In another aspect, a CPL computing device associated with a covered parking location may be provided. The CPL computing device may include a processor and a memory. The processor may be programmed to transmit a location identifier of the covered parking location and a communication address of the CPL computing device to a vehicle computing device and/or an insurance computing device. The processor may be further programmed to transmit a signal to the vehicle computing device indicating a number of available parking spots of the covered parking location when the vehicle computing device contacts the CPL computing device. The processor may also be programmed to receive a request from the vehicle computing device to reserve a parking spot of the covered parking location, determine whether to accept the request, and/or transmit a response to the vehicle computing device. Accepting the request from the vehicle computing device may cause the CPL computing device to permit a vehicle associated with the vehicle computing device access to the covered parking location. The CPL computing device may include additional, less, or alternate functionality and components, including those described herein.

In yet another aspect, an insurance computing device may be provided. The insurance computing device may include a processor and a memory. The processor may be programmed to receive a registration request from a vehicle computing device associated with a vehicle and/or a CPL computing device associated with a covered parking location. The processor may be further programmed to generate a usage profile associated with the vehicle and/or the covered parking location. The processor may also be programmed to monitor the vehicle computing device and/or the CPL computing device for any requests to reserve an available parking spot of the covered parking location and/or update the usage profile. The processor may be programmed to determine if an insurance policy associated with the vehicle and/or the covered parking location is eligible for insurance-related benefits based upon the usage profile. The insurance computing device may include additional, less, or alternate functionality and components, including those described herein.

In a further aspect, a computer-implemented method for identifying a covered parking location may be provided. The method may implemented by a vehicle computing device associated with a vehicle. The method may include receiving weather data including current weather data and/or predicted weather data of a region that includes the vehicle. The method may further include determining from the weather data that the region will experience inclement weather within a predetermined period of time and/or identifying a covered parking location that includes an available parking spot. The method may also include transmitting a request to reserve the available parking spot to a CPL computing device and/or receiving permission to access the covered parking location. The method may include additional, less, or alternate actions, including those discussed elsewhere herein.

In yet another aspect, a computer-implemented method for providing covered parking to vehicles may be provided. The method may be implemented by a CPL computing device. The method may include transmitting a location identifier of the covered parking location and a communication address of the CPL computing device to at least one of a vehicle computing device and an insurance computing device. The method may further include transmitting a signal to the vehicle computing device indicating a number of available parking spots of the covered parking location when the vehicle computing device contacts the CPL computing device and/or receiving a request from the vehicle computing device to reserve a parking spot of the covered parking location. The method may also include determining whether to accept the request and/or transmitting a response to the vehicle computing device. Accepting the request may cause the CPL computing device to permit the vehicle access to the covered parking location. The method may include additional, less, or alternate actions, including those discussed elsewhere herein.

In another aspect, a computer-implemented method for providing insurance-related benefits may be provided. The method may be implemented by an insurance computing device. The method may include receiving a registration request from a vehicle computing device associated with a vehicle and/or a CPL computing device associated with a covered parking location. The method may further include generating a usage profile associated with the vehicle and/or the covered parking location. The method may also include monitoring the vehicle computing device and/or the CPL computing device for any requests to reserve an available parking spot of the covered parking location and/or updating the usage profile. The method may include determining if an insurance policy associated with the vehicle and/or the covered parking location is eligible for insurance-related benefits based upon the usage profile. The method may include additional, less, or alternate actions, including those discussed elsewhere herein.

In a further aspect, at least one non-transitory computer-readable storage media having computer-executable instructions embodied thereon may be provided. The computer-executable instructions, when executed by at least one processor, may cause the processor to receive weather data of a region that includes a vehicle, the weather data including at least one of current weather data and predicted weather data and/or determine from the weather data that the region will experience inclement weather within a predetermined period of time. The computer-executable instructions may further cause the processor to identify a covered parking location that includes an available parking spot, transmit a request to reserve the available parking spot to a CPL computing device, and/or receive permission to access the covered parking location. Additional, less, or alternate instructions may be provided such as instructions directing the functionality discussed elsewhere herein.

In another aspect, at least one non-transitory computer-readable storage media having computer-executable instructions embodied thereon may be provided. The computer-executable instructions, when executed by at least one processor, may cause the processor to transmit a location identifier of a covered parking location and a communication address of a CPL computing device to a vehicle computing device and/or an insurance computing device. The computer-executable instructions may further cause the processor to transmit a signal to the vehicle computing device indicating a number of available parking spots of the covered parking location when the vehicle computing device contacts the CPL computing device and/or receive a request from the vehicle computing device to reserve a parking spot of the covered parking location. The computer-executable instructions may also cause the processor to determine whether to accept the request and/or transmit a response to the vehicle computing device. Accepting the request may cause the CPL computing device to permit the vehicle access to the covered parking location. Additional, less, or alternate instructions may be provided such as instructions directing the functionality discussed elsewhere herein.

In a further aspect, at least one non-transitory computer-readable storage media having computer-executable instructions embodied thereon may be provided. The computer-executable instructions, when executed by at least one processor, may cause the processor to receive a registration request from a vehicle computing device associated with a vehicle and/or a CPL computing device associated with a covered parking location. The computer-executable instructions may further cause the processor to generate a usage profile associated with the vehicle and/or the covered parking location and/or monitor the vehicle computing device and/or the CPL computing device for any requests to reserve an available parking spot of the covered parking location. The computer-executable instructions may also cause the processor to update the usage profile and/or determine if an insurance policy associated with at least one of the vehicle and the covered parking location is eligible for insurance-related benefits. Additional, less, or alternate instructions may be provided such as instructions directing the functionality discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
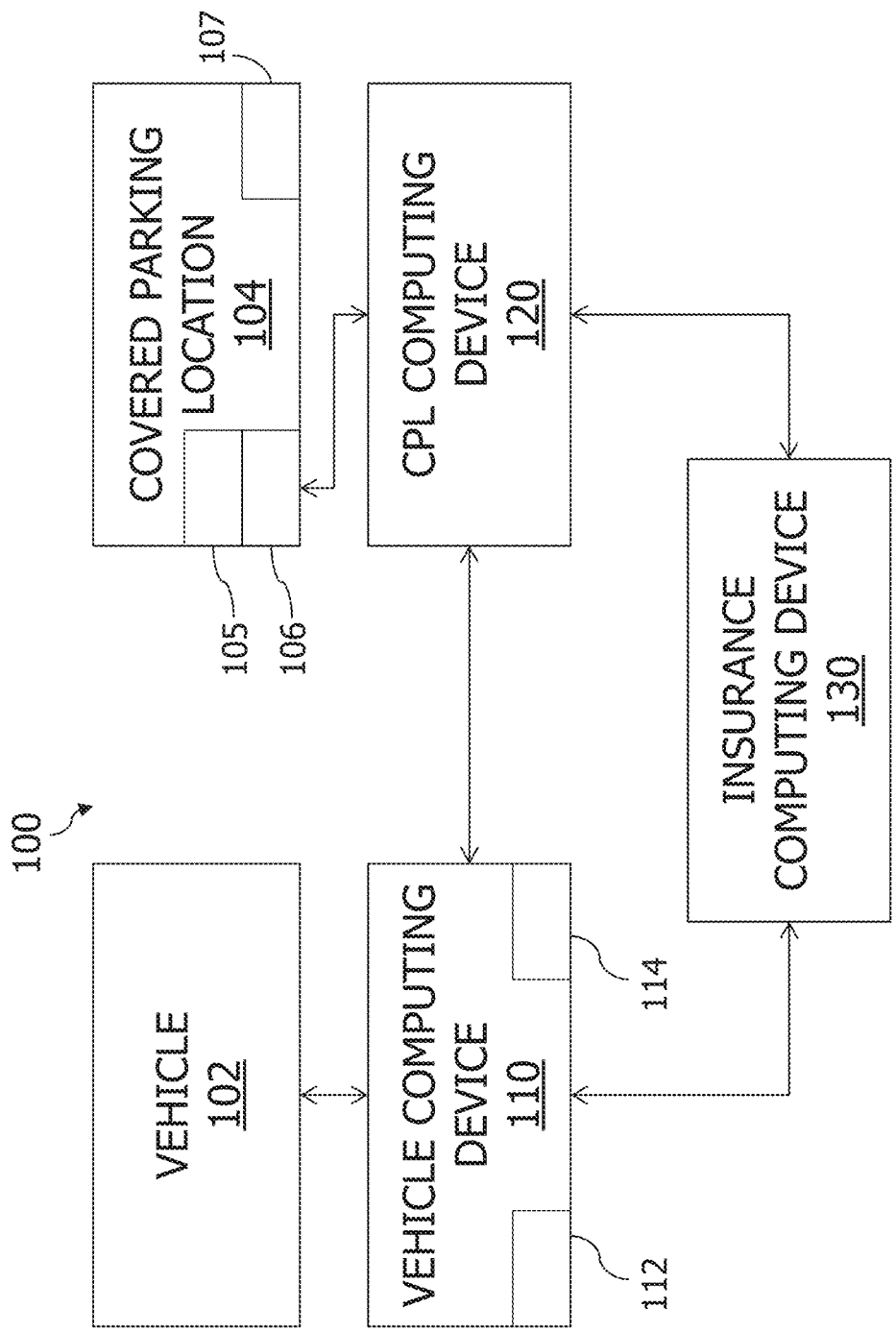
FIG. 1 illustrates an exemplary vehicle weather damage-prevention system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for weather-related vehicle damage prevention. In particular, the present embodiments may relate to systems and methods for identifying undesirable weather conditions and locating a covered parking location. As used herein, a vehicle may include any land, nautical, and aeronautical vehicle. The vehicle may be manually operated and/or automatically operated (i.e., a self-driving or autonomous (or semi-autonomous) vehicle). A vehicle computing device associated with the vehicle may be configured to receive weather data indicating a weather condition of a region (e.g., a county, a zip code, a city, a state) that includes the vehicle. The vehicle computing device may be a computing device installed in the vehicle and/or a user computing device associated with a user of the vehicle (e.g., a vehicle owner, a driver or passenger of the vehicle). The weather data may include previous weather data, current weather data, and/or predicted weather data. A weather condition may include, but is not limited to, hail, wind, ice, rain, thunderstorms, snow, and/or sun conditions.

The vehicle computing device may be configured to determine if the weather condition may cause damage or other undesirable effects to the vehicle (also referred to as "inclement weather" or "inclement weather condition"). Other undesirable effects may include, for example, preventing the vehicle from moving and/or loss of control of the vehicle. In some embodiments, the vehicle computing device may receive weather warnings indicating potentially dangerous weather. Additionally or alternatively, the vehicle computing device may calculate one or more weather condition scores associated with the likelihood of damage or other undesirable effects to the vehicle. The weather condition scores may be based upon weather data such as, but not limited to, hail size, amount of snow or ice, and/or wind conditions.

In the exemplary embodiment, the vehicle computing device may include a display configured to present the weather data, the weather warnings, and/or the weather condition scores to the vehicle user. The display may further be configured to present vehicle information such as fuel amount, tire pressure, and distance from a location associated with the vehicle user (e.g., the vehicle user's home or work). The vehicle user may provide input to the vehicle computing device to locate a covered parking location. In other embodiments, the vehicle computing device automatically begins to locate a covered parking location based upon the weather data, the weather warnings, and/or the weather condition scores. A covered parking location may include, for example, a garage, a parking deck, a parking lot with a roof, underneath a bridge, and/or any location configured to house a vehicle that protects the vehicle from weather conditions such as hail and snow. The covered parking location may further include doors, barricades, locks, access terminals (e.g., terminals that, when presented access information, permit vehicles to enter and exit the covered parking location), sensors, cameras, video cameras, and/or other components to facilitate preventing unauthorized access to the covered parking location or an infrastructure associated with the covered parking location (e.g., a home).

In the exemplary embodiment, the vehicle computing device may be in communication with one or more covered parking location (CPL) computing devices. Each CPL computing device may be associated with a covered parking location. The CPL computing devices may be mobile devices (e.g., another vehicle computing device, a smartphone, a laptop, a tablet, a wearable electronics, etc.), remote computing devices, host computing devices, and/or other computing devices such as desktop computing devices.

In the exemplary embodiment, the vehicle computing device may receive information regarding one or more covered parking locations including at least one location identifier (e.g., a street address and/or a latitude and longitude) from the CPL computing devices. In addition to location identifiers, the information received from the CPL computing devices may include communication addresses (e.g., IP addresses) for each CPL computing device to enable the vehicle computing device to call or contact the CPL computing devices. The information including the location identifiers and/or the communication address may be stored within a memory connected to the vehicle computing device. In some embodiments, the vehicle computing device receives the information continuously as new CPL computing devices are detected (or when each CPL computing device detects a new vehicle computing device). In other embodiments, the vehicle computing device may not receive the information until the vehicle computing device begins to locate a covered parking location.

In the exemplary embodiment, the vehicle computing device may select a covered parking location to reserve a parking spot based upon, for example, user input, proximity of the covered parking location to the vehicle, and/or type of covered parking location. The vehicle computing device may retrieve information about covered parking locations based upon location identifiers of each covered parking location stored in the memory to determine where the covered parking locations are located relative to the vehicle. In some embodiments, the vehicle computing device may perform a communication address lookup in the memory to contact the CPL computing device associated with the covered parking location to request current or additional information about the covered parking location. Each CPL computing device may be configured to identify availability of a parking spot in the associated covered parking location. If the associated covered parking location has available parking spots, the CPL computing device may indicate to the vehicle computing device the available parking spots. The CPL computing devices may further indicate a price for reserving the parking spots.

When a covered parking location is selected and the vehicle computing device has located a communication address of a CPL computing device associated with the covered parking location, the vehicle computing device may be configured to transmit a request to reserve a parking spot, payment information (e.g., a payment card number, a bank account number, etc.), and/or a vehicle user profile to the CPL computing device. The vehicle user profile may include information associated with the vehicle and/or one or more vehicle users to provide a user associated with the CPL computing device more information to determine whether to accept or decline the request to reserve the parking spot. For example, a user may list his or her garage as a covered parking location and may receive a request from a vehicle user to reserve a parking spot. A vehicle user profile of the vehicle user may include negative reviews from other users associated with CPL computing devices and the user determines to decline the request.

If a user of the CPL computing device accepts the request from the vehicle computing device, the CPL computing device may be configured to provide access to the covered parking location to the vehicle. For example, the CPL computing device may transmit an access code to the vehicle computing device and/or automatically open a door or barricade of the covered parking location. In another example, the sensors and/or the access terminal at the covered parking location may be configured to identify information associated with the vehicle or vehicle user, such as, but not limited to, a license plate number, a vehicle identification number (VIN), and/or a driver's license number. The vehicle computing device may receive directions to the covered parking location. The vehicle may then be parked at the covered parking location to prevent damage and other undesirable effects to the vehicle. In some embodiments, the CPL computing device may be configured to limit the access of the vehicle owner to the covered parking location. For example, if a vehicle is to be parked in a user's home garage, the CPL computing device may lock any doors to the inside of the user's home.

In the exemplary embodiment, an insurance computing device may be in communication with the vehicle computing device and/or the CPL computing device. The insurance computing device may be associated with an insurance provider such as an insurance carrier associated with the vehicle and/or the covered parking location and/or a third party associated with the insurance carrier. The insurance computing device may be configured to provide insurance-related benefits based upon the use of a covered parking location. The insurance-related benefits may include, for example, an insurance policy adjustment, an insurance reward offer (e.g., a discount), and/or reduced costs of an insurance policy. The insurance-related benefits may be applied to an insurance policy associated with the vehicle and/or the covered parking location.

The vehicle computing device and/or the CPL computing device may be configured to register with the insurance computing device to identify the associated insurance policy. The insurance computing device may provide the insurance-related benefits for registering. The insurance computing device may receive the weather data and/or the weather warnings of a plurality of regions. The insurance computing device may be configured to monitor the vehicle computing devices within regions with potentially inclement weather. The insurance computing device may store and update a usage profile for each registered vehicle computing device to determine if the insurance policy associated with the vehicle is eligible for the insurance-related benefits. The usage profile may be associated with a policyholder of a vehicle or a covered parking location. The usage profile may indicate how often the vehicle or the covered parking location is affected by inclement weather. For the vehicle, the usage profile may further indicate how often the vehicle is parked at a covered parking location during inclement weather. For the covered parking location, the usage profile may further indicate how often the covered parking location permits vehicles to park in the covered parking spots. Based upon the usage profile, the insurance computing device may be configured to determine the eligibility of the insurance policy for the insurance-related benefits. The insurance computing device may then apply any eligible benefits to the insurance policy. In some embodiments, a user associated with the vehicle computing device and/or the CPL computing device may accept or decline the insurance-related benefits.

At least one of the technical problems addressed by this system may include: (i) limited prediction of inclement weather and weather warnings for vehicles; (ii) vehicle damage caused by weather conditions; (iii) increased costs from repairing a vehicle and an insurance policy associated with the vehicle; (iv) some vehicles may not have access to covered parking locations; and/or (v) conventionally, the location and availability of covered parking locations may not be accessible by a vehicle user.

A technical effect of the systems and processes described herein may be achieved by performing at least one of the following steps: (a) receiving, at a vehicle computing device associated with a vehicle, weather data and/or a weather warning; (b) determining if the weather includes inclement weather conditions; (c) identifying a covered parking location (CPL) computing device associated with a covered parking location with available parking spots by detecting covered parking locations near the vehicle location stored within a memory device of the vehicle computing device and then contacting the CPL computing device of the covered parking location to determine, for example, availability, cost, and/or type of covered parking location; (d) transmitting a request to the CPL computing device; (e) determining, by the CPL computing device, whether to permit the vehicle access to the covered parking location; (f) receiving, from the CPL computing device, access to the covered parking location; (g) monitoring, with an insurance computing device, the vehicle computing device and/or the CPL computing device; and/or (h) determining if an insurance policy associated with the vehicle and/or the covered parking location is eligible for an insurance-related benefit.

The technical effect achieved by this system may be at least one of: (i) increased prediction of inclement weather; (ii) preventing vehicle damage caused by weather conditions; (iii) reduced vehicle damage may reduce repair costs and costs of insurance policies for the insured and/or the insurance provider; (iv) increased accessibility to covered parking locations for vehicles; and/or (v) increased awareness for the vehicle users of the availability and location of the covered parking locations.

Exemplary Vehicle Weather Damage-Prevention System

FIG. 1 depicts an exemplary vehicle weather damage-prevention system 100. System 100 may include a vehicle 102, a covered parking location 104, a vehicle computing device 110, a covered parking location (CPL) computing device 120, and/or an insurance computing device 130. System 100 may include additional, fewer, or alternate components, including those discussed elsewhere herein.

Vehicle 102 may include any land, nautical, and aeronautical vehicle. The vehicle may be manually operated and/or automatically operated (i.e., a self-driving or autonomous vehicle). System 100 may further include a plurality of vehicles 102. In some embodiments, vehicle 102 may include a display (not shown) that provides information to a vehicle user. The vehicle user may be, for example, an owner, a driver, and/or a passenger of vehicle 102. Some weather conditions, such as hail, snow, fog, ice, lightning, wild fires, floods, and/or rain (also referred to as "inclement weather conditions"), may cause damage or other undesirable effects to vehicle 102. Other undesirable effects may include, for example, preventing the vehicle from moving and/or loss of control of the vehicle. For example, a large amount of snow may prevent vehicle 102 from moving. In another example, hail may impact vehicle 102 and cause damage to vehicle 102 such as window damage and frame damage.

Covered parking location 104 may include, for example, a garage, a parking deck, a parking lot with a roof, underneath a bridge, a warehouse, a covered marina, and/or any location configured to house a vehicle that protects vehicle 102 from weather conditions such as hail and snow. System 100 may further include a plurality of covered parking locations 104. In the exemplary embodiment, covered parking location 104 may be associated with CPL computing device 120. In some embodiments, covered parking location 104 may sell parking spots and/or access to covered parking location 104. For example, a parking deck for in a city location may require vehicle users to pay an hourly rate for use of the parking deck. Covered parking location 104 may further include doors, barricades, locks, access terminals (e.g., terminals that, when presented access information, permit vehicles to enter and exit the covered parking location), sensors, cameras, video cameras, and/or other components to facilitate preventing unauthorized access to the covered parking location or an infrastructure associated with covered parking location 104 (e.g., a home). In the exemplary embodiment, covered parking location 104 may include a barricade 105, an access terminal 106, and sensors 107.

Barricade 105 may be configured to selectively prevent vehicle 102 from entering and/or exiting covered parking location 104. Barricade 105 may include, for example, a mechanical arm, a raised surface, a garage door, and/or a fence. Barricade 105 may be configured to receive a signal from vehicle 102, access terminal 106, sensors 107, vehicle computing device 110, CPL computing device 120, and/or a different computing device to selectively permit vehicle 102 access to covered parking location 104. For example, in certain embodiments in which barricade 105 is a garage door, barricade 105 may receive a signal that causes barricade 105 to open or close.

Access terminal 106 may be installed at covered parking location 104. Access terminal 106 may include, for example, one or more processors, programmable logic circuits (PLC), microcontrollers, reduced instruction set circuits (RISC), application specific integrated circuits (ASIC), a computing device as described herein, and/or other computing devices configured to authenticate vehicle 102. In some embodiments, access terminal 106 may include a memory configured to store computer instructions and/or data received from system 100.

Access terminal 106 may further include a communication interface, an input interface, and/or an output interface (each interface not shown). In the exemplary embodiment, access terminal may be in communication with barricade 105 to selectively control the operation of barricade 105. In some embodiments, access terminal 106 may be in communication with vehicle computing device 110, CPL computing device 120, insurance computing device 130, and/or another computing device associated with vehicle 102 or covered parking location 104. In certain embodiments, access terminal 106 may be in communication with a controller (not shown) integrated into covered parking location 104 and/or an infrastructure associated with covered parking location 104. The controller may be configured to restrict access of covered parking location 104 and/or the infrastructure. In one example in which covered parking location 104 is a garage attached to a residential house, the controller may be configured to lock any doors and windows into the house, turn on external lights, and/or activate a security system installed in the house. The preventative measures may deter criminal or otherwise undesirable activity. In other embodiments, access terminal 106 may be configured to provide the features of the above described controller.

The input interface of access terminal 106 may be configured to receive access information and/or payment information to authenticate vehicle 102 as described herein. The input interface may include, for example, a card reader, a keypad, a near-field communication (NFC) reader, a Bluetooth interface, a Wi-Fi interface, a radio-frequency identification (RFID) interface, an infrared (IR) interface, a microphone, and/or a camera. The output interface of the access terminal may include, but is not limited to, a light-emitting diode (LED) indicator, a display, a speaker, and/or a ticket printer (i.e., parking verification in the form of a card or ticket is printed and presented to the vehicle user) for providing information to the vehicle user. In some embodiments, access terminal 106 may be configured to store a total number of parking spots in covered parking location 104 and the number of occupied or reserved parking spots.

Sensors 107 installed at covered parking location 104 may include, but are not limited to, motion sensors, heat sensors, weight sensors, cameras, video cameras, microphones, security sensors, and/or any other sensors configured to monitor covered parking location 104. Sensors 107 may be in communication with access terminal 106, vehicle computing device 110, CPL computing device 120, and/or a different computing device to transmit sensor data. In some embodiments, sensors 107 may identify vehicle 102 and transmit sensor data to access terminal 106 and/or CPL computing device 120 to permit vehicle 102 access to covered parking location 104. Additionally or alternatively, sensors 107 may be in communication with a security system installed at covered parking location 104 and/or an infrastructure associated with covered parking location 104.

Vehicle computing device 110 may be associated with vehicle 102 and/or a vehicle user. Vehicle computing device 110 may be a computing device described herein or a different computing device. Vehicle computing device 110 may be, but is not limited to, a computing device installed in vehicle 102 and/or a user computing device of the vehicle user. In some embodiments, a plurality of vehicle computing devices 110 may be associated with vehicle 102 and/or the vehicle user. In certain embodiments, system 100 may include a first vehicle computing device 110 installed in vehicle 102 and a second vehicle computing device 110 that is a mobile device (e.g., a smartphone, tablet, laptop, phablet, wearable electronic, smart watch) running a mobile app. Vehicle computing device 110 may be in communication with vehicle 102, access terminal 106, CPL computing device 120, insurance computing device 130, and/or a different computing device, such as via wireless communication or data transmission.

Vehicle computing device 110 may include a memory 112 as described further below. Memory 112 may be configured to store, for example, weather data, location identifiers, communication addresses, and/or other information about weather, covered parking locations, and/or the vehicle as described herein. Each location identifier may be associated with a covered parking location and may include, but is not limited to, a street address or a latitude and longitude (e.g., GPS coordinates) of the covered parking location. The communication addresses such as IP addresses may be associated with a CPL computing device (e.g., CPL computing device 120) and may enable vehicle computing device 110 to call or contact the CPL computing device to retrieve additional and/or current information about the covered parking location or to reserve a parking spot as described below.

In the exemplary embodiment, vehicle computing device 110 may be configured to receive weather data with a weather condition. The weather data may include previous weather data, current weather data, and/or predicted weather data. A weather condition may include, but is not limited to, hail, ice, wind, rain, thunderstorms, snow, and/or sun conditions. In the exemplary embodiment, the weather data may be collected from a region (e.g., a county, a zip code, a city, a state) that includes vehicle 102. In some embodiments, the weather data may be collected from a region that does not include vehicle 102. For example, the weather data may include weather conditions that are moving towards the region including vehicle 102. In the exemplary embodiment, vehicle computing device 110 may further be configured to receive a weather warning indicating inclement weather conditions. Vehicle computing device 110 may not receive the weather warning until inclement weather conditions are identified. Vehicle computing device 110 may receive the weather data and/or the weather warning from a remote server computing device (not shown). In other embodiments, vehicle computing device 110 may receive the weather data and/or the weather warning from a different computing device, such as CPL computing device 120 and/or insurance computing device 130. In certain embodiments, vehicle computing device 110 may collect at least a portion of the weather data using sensors (not shown) installed in vehicle 102 and/or vehicle computing device 110.

In the exemplary embodiment, vehicle computing device 110 may be configured to determine if the weather data and/or the weather warning indicates any inclement weather conditions that may affect vehicle 102. In some embodiments, vehicle computing device 110 may use the weather warning to automatically identify inclement weather conditions. Additionally or alternatively, vehicle computing device 110 may be configured to generate one or more weather condition scores based upon the weather data and/or the weather warning. The weather condition scores may represent a likelihood of inclement weather affecting or not affecting vehicle 102. The weather condition scores may be based upon weather data such as, but not limited to, hail size, amount of snow, and/or wind conditions. In at least one embodiment, each weather condition score may be associated with a specific weather condition (e.g., hail size, precipitation level, and/or wind speed).

In the exemplary embodiment, vehicle computing device 110 may further include a display 114 to present the weather data, the weather warning, and/or the weather condition scores to the vehicle user. In at least some embodiments, display 114 is further configured to present vehicle information of vehicle 102, such as fuel amount, tire pressure, and distance from a location associated with the vehicle user (e.g., the vehicle user's home or work). The weather data, the weather warning, the weather condition scores, and/or the vehicle information may indicate that inclement weather may affect vehicle 102 and it may be recommended to locate covered parking. In some embodiments, vehicle computing device 110 automatically begins to locate a covered parking location (e.g., covered parking location 104). Additionally or alternatively, the vehicle user may provide input to vehicle computing device 110 to location a covered parking location.

In the exemplary embodiment, vehicle computing device 110 may be configured to detect nearby covered parking locations and/or CPL computing devices. In other embodiments, vehicle computing device may receive information about nearby covered parking locations and/or CPL computing devices from one or more remote computing devices, such as CPL computing device 120 and/or insurance computing device 130. If detected, vehicle computing device 110 may request or retrieve a location identifier and a communication address associated with the covered parking location and the CPL computing device to determine the proximity of the covered parking location and contacting the CPL computing device to receive additional information. In certain embodiments, vehicle computing device 110 may further request or receive a name of the covered parking location and/or a type of covered parking location.

Vehicle computing device 110 may further be configured to communicate with any CPL computing devices (including CPL computing device 120) associated with a communication address stored within memory 112 to identify any available parking spots for vehicle 102. In some embodiments, vehicle computing device 110 may be configured to determine the proximity of each covered parking location based upon one or more location identifiers of the covered parking location. Vehicle computing device 110 may identify the communication addresses associated with covered parking locations near vehicle 102. Using the communication address vehicle computing device 110 may attempt to contact or call the CPL computing device associated with the covered parking location (e.g., CPL computing device 120 and covered parking location 104). As described further below, vehicle computing device may receive additional or current information from the CPL computing device such as availability of parking spots and the cost of the parking spots.

In some embodiments, vehicle computing device 110 may select a covered parking location with available parking spots to reserve a parking spot based upon, for example, user input, proximity of the covered parking location relative to vehicle 102, the cost of parking in the covered parking location, and/or type of covered parking location (e.g., a parking deck, residential garage, etc.). In at least one embodiment, vehicle computing device 110 may not request to reserve a parking spot. For example, a parking lot at a shopping mall may not require reserving a parking spot.

Vehicle computing device 110 may be configured to transmit, for example, a request to reserve a parking spot, payment information (e.g., a payment card number, a bank account number, etc.), and/or a vehicle user profile to the CPL computing device of the covered parking location (e.g., CPL computing device 120 and covered parking location 104). Memory 112 may be configured to store the payment information and/or the vehicle user profile. The vehicle user profile may include information associated with vehicle 102 and/or one or more vehicle users of vehicle 102 to provide the CPL computing device more information to determine whether to accept or decline the request to reserve the parking spot. In some embodiments, the vehicle user profile may include, but is not limited to, a background check of a vehicle user, peer reviews, ratings, and/or the make and model of vehicle 102.

In the exemplary embodiment, CPL computing device 120 may be a mobile device (e.g., another vehicle computing device 110, a smartphone, a laptop, a tablet, a wearable electronics, etc.), a remote computing device, a host computing device, and/or another computing device such as a desktop computing device. In some embodiments, covered parking location 104 may be associated with a plurality of CPL computing devices 120. In certain embodiments, CPL computing device 120 may be integrated into covered parking location 104 or an infrastructure associated with covered parking location 104.

CPL computing device 120 may be configured to transmit a location identifier of covered parking location 104 and a communication address to vehicle computing device 110. In the exemplary embodiment, vehicle computing device 110 may detect CPL computing device 120 and request the location identifier and the communication address. In another embodiment, CPL computing device 120 and/or access terminal 106 may detect vehicle 102 or vehicle computing device 110 and may then transmit the location identifier and the communication address to vehicle computing device 110. In a further embodiment, CPL computing device 120 may broadcast the location identifier and the communication address for any vehicle computing devices to receive. In other embodiments, CPL computing device 120 may transmit the location identifier and/or the communication address to a different computing device to be stored, such as insurance computing device 130 or another remote computing device. Vehicle computing device 110 may retrieve the location identifier and/or the communication address from the other computing device. In some embodiments, vehicle computing device 110 may be configured to receive or request the location identifiers and the communication address when vehicle 102 is within a certain distance (pre-defined or determined by the weather data) of the covered parking locations.

When vehicle computing device 110 is determining which covered parking location to select, vehicle computing device 110 may communicate with CPL computing device 120 using the communication address. In the exemplary embodiment, CPL computing device 120 may be configured to provide additional and/or current information regarding covered parking location 104, such as, but not limited to, capacity, availability, the cost of parking in covered parking location 104, and/or the type of covered location (e.g., residential or commercial). If the vehicle user selects covered parking location 104, vehicle computing device 110 may transmit a request to reserve a parking spot in covered parking location 104 as described in detail herein. In some embodiments, CPL computing device 120 may further transmit the number of available parking spots and the other information regarding covered parking location 104 to a different computing device such insurance computing device 130 and/or a remote computing device (not shown). In at least one embodiment, vehicle computing device 110 and CPL computing device 120 may be in communication via insurance computing device 130 and/or the remote computing device.

In at least some embodiments, CPL computing device 120 may be configured to monitor the number of available parking spots in covered parking location 104. In certain embodiments, CPL computing device 120 may receive the number of available parking spots from access terminal 106. Additionally or alternatively, CPL computing device 120 may monitor the number of available parking spots based upon requests received from vehicle computing devices (e.g., vehicle computing device 110). In the exemplary embodiment, CPL computing device 120 may receive the request to reserve a parking spot, the payment information, and/or the vehicle user profile associated with vehicle 102 from vehicle computing device 110. Based upon the received information, CPL computing device 120 may determine whether to accept or decline the request. In the exemplary embodiment, CPL computing device 120 may receive user input from a user associated with CPL computing device 120 to accept or decline the request. Additionally or alternatively, CPL computing device 120 may store configurable settings that enable CPL computing device 120 to automatically accept or decline the request.

If the request is accepted, CPL computing device 120 may be configured to transmit an access code to access terminal 106 and/or vehicle computing device 110. In some embodiments, access terminal 106 may be configured to transmit the access code to vehicle computing device 110 and/or CPL computing device 120. The access code may include, but is not limited to, a numeric code or password, a text code, a bar code, a quick response (QR) code, an audible code, a biometric code, a RFID code, and/or an electronic token. In some embodiments, vehicle computing device 110 transmits the access code to access terminal 106 for authentication. In other embodiments, the vehicle user may input the access code into access terminal 106. Access terminal 106 may be configured to verify the access code. In certain embodiments, access terminal 106 may be in communication with CPL computing device 120 to verify the access code. Once the access code is verified, access terminal 106 and/or CPL computing device 120 may be configured to permit vehicle 102 to enter covered parking location 104.

In the exemplary embodiment, access terminal 106 may be configured to manipulate barricade 105 from a closed position (i.e., a position such that vehicle 102 may not enter covered parking location 104) to an open position. Additionally or alternatively, CPL computing device 120 may be configured to remotely control barricade 105 and/or access terminal 106 to permit vehicle 102 access. In certain embodiments, vehicle computing device 110 and/or sensors 107 may be configured to indicate to CPL computing device 120 that vehicle 102 is near covered parking location 104. CPL computing device 120 may control barricade 105 and/or access terminal 106 to permit vehicle 102 access to covered parking location 104 without transmitting the access code. Barricade 105, access terminal 106, CPL computing device 120, and/or any exit components such as additional barricades 105 and access terminals 106 (both not shown) may be configured to receive input from the vehicle user and/or vehicle computing device 102 to permit vehicle 102 to leave covered parking location 104.

In some embodiments, CPL computing device 120 may be configured to monitor sensors 107 and/or the duration that vehicle 102 is parked in covered parking location 104. In certain embodiments, access terminal 106 may monitor how long vehicle 102 is parked. The price of the reserved parking spot may be based upon the duration, date, and/or time that vehicle 102 parked in covered parking location 104. It is to be understood that at any time that the payment information received from vehicle computing device 110 may be used to process a transaction for the reserved parking spot.

In the exemplary embodiment, insurance computing device 130 may be in communication with vehicle computing device 110 and/or CPL computing device 120. In some embodiments, system 100 may include a plurality of insurance computing devices 130. Insurance computing device 130 may be a computing device as described herein or any other computing device. Insurance computing device 130 may be associated with an insurance provider. The insurance provider may be an insurance carrier and/or a third party associated with the insurance carrier. The insurance provider may be associated with vehicle 102 and/or covered parking location. To promote reducing vehicle damage and other undesirable effects due to inclement weather (and potentially reducing insurance costs associated with vehicles), the insurance provider may provide insurance-related benefits to one or more insurance policies that may be associated with vehicle 102 and/or covered parking location 104. The insurance-related benefits may include, for example, an insurance policy adjustment, an insurance reward offer (e.g., a discount), and/or reduced costs of an insurance policy.

Vehicle computing device 110 and/or CPL computing device 120 may be configured to register with insurance computing device 130. For vehicle computing device 110, registering may include, for example, identifying an insurance policy associated with vehicle 102, payment information, the vehicle user profile, and/or any additional information on vehicle 102 and/or the vehicle user. For CPL computing device 120, registering may include, for example, identifying an insurance policy associated with covered parking location 104, payment information, a location identifier, a communication address, and/or any additional information about covered parking location 104, infrastructure associated with covered parking location 104, and/or a user associated with CPL computing device 120. In the exemplary embodiment, insurance computing device 130 may store at least a portion of the information provided during registration. In some embodiments, insurance computing device 130 may be configured to provide insurance-related benefits for registering.

Insurance computing device 130 may be configured to monitor vehicle computing device 110 and/or CPL computing device 120. In the exemplary embodiment, insurance computing device 130 may be configured to monitor registered vehicle computing devices and/or CPL computing devices. In some embodiments, insurance computing device 130 may be configured to receive weather data and/or weather warnings of one or more regions. Insurance computing device 130 may further be configured to determine whether vehicle 102 and/or vehicle computing device 110 may be affected by inclement weather over a predetermined time. In certain embodiments, insurance computing device 130 may determine whether covered parking location 104 and/or CPL computing device 120 may be affected by inclement weather. Insurance computing device 130 may be configured to store a table of location identifiers and communication addresses of registered covered parking locations and CPL computing devices. In some embodiments, vehicle computing device 110 may receive location identifiers and communication addresses associated with covered parking locations near vehicle 102 from insurance computing device 130. Insurance computing device 130 may also be configured to receive information associated with access terminal 106, the vehicle user profile, whether vehicle 102 was accepted or rejected by CPL computing device 120, and/or times and/or dates that vehicle 102 entered and exited covered parking location 104.

In the exemplary embodiment, insurance computing device 130 may be configured to store and/or update a usage profile for vehicle computing device 110 and/or CPL computing device 120 to determine if any associated insurance policies are eligible for the insurance-related benefits. The usage profile may be associated with vehicle 102 and/or covered parking location 104. The usage profile may indicate how often vehicle 102 or covered parking location 104 is affected by inclement weather. For vehicle computing device 110, the usage profile may further indicate how often vehicle 102 is parked at a covered parking location during inclement weather. For CPL computing device 120, the usage profile may further indicate how often covered parking location 104 permits vehicles to park in the parking spots.

Based upon the usage profile, insurance computing device 130 may provide insurance-related benefits. For example, a usage profile associated with vehicle computing device 110 may indicate that vehicle 102 has been previously located in a region with inclement weather ten times. The usage profile may further indicate vehicle computing device 110 reserved a parking spot in covered parking location 104 nine of the ten times with inclement weather. Vehicle 102 entered covered parking location 104 only eight times. Insurance computing device 130 may determine what insurance-related benefits the insurance policy associated with vehicle 102 is eligible to receive based upon the usage profile.

Exemplary Commercial Covered Parking Location

Figure 2:
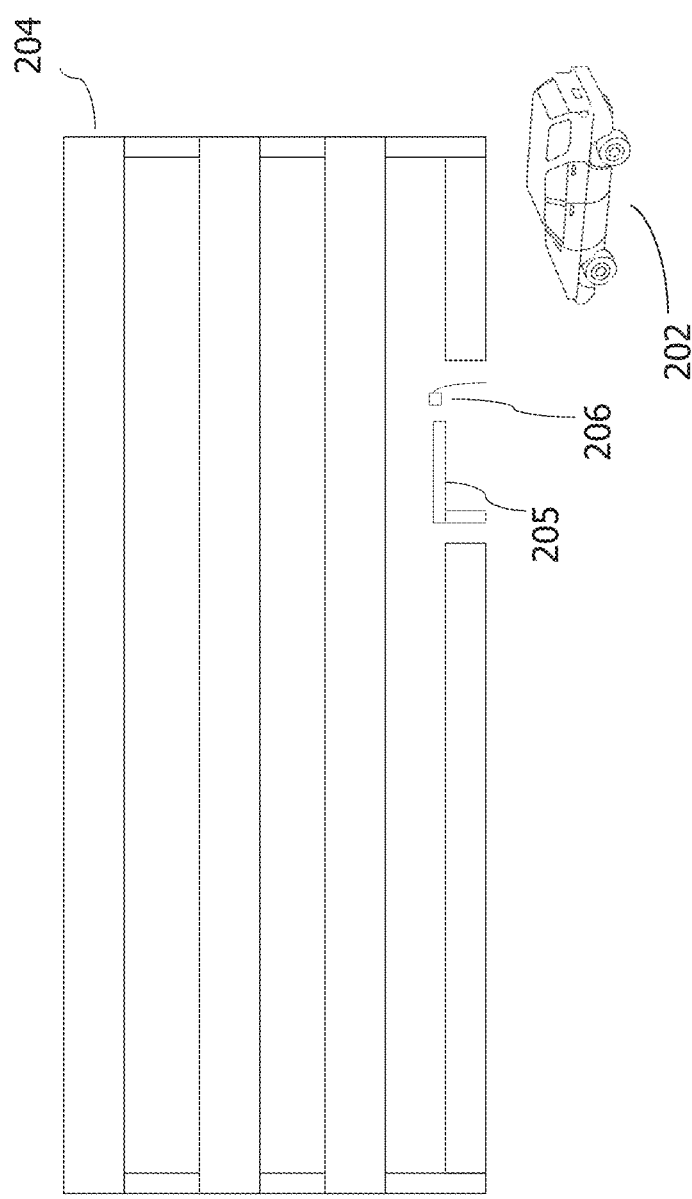
FIG. 2 illustrates an exemplary vehicle at an exemplary covered parking location that may be part of a vehicle weather damage-prevention system, such as the system shown in FIG. 1.

FIG. 2 depicts an exemplary vehicle 202 at an exemplary covered parking location 204. Vehicle 202 and/or covered parking location 204 may be used in a vehicle weather damage-prevention system, such as system 100 shown in FIG. 1. In this embodiment, vehicle 202 and/or covered parking location 204 may be similar to vehicle 102 and/or covered parking location 104 shown in FIG. 1. Vehicle 202 and/or covered parking location 204 may include additional, fewer, or alternate components, including those discussed elsewhere herein.

In the exemplary embodiment, vehicle 202 may bean automobile. As described above, vehicle 202 may be in communication with a vehicle computing device (e.g., vehicle computing device 110, shown in FIG. 1). In one example, a parking spot of covered parking location 204 may be reserved for vehicle 202.

In the exemplary embodiment, covered parking location 204 may be a commercial parking garage (also referred to as a "parking deck") configured to include a plurality of parking spots for vehicles. Covered parking location 204 may include a barricade 205 and/or an access terminal 206. In the absence of contrary representation, barricade 205 and/or access terminal 206 may be similar to barricade 105 and/or access terminal 106 shown in FIG. 1. In the illustrated embodiment, barricade 205 and access terminal 206 may be configured for entry to covered parking locations. It is to be understood that covered parking location 204 may further include additional barricades 205 and/or access terminals 206 to enable vehicle 202 to enter and exit covered parking location 204. In the exemplary embodiment, barricade 205 may be a mechanical arm configured to actuate to selectively permit vehicle 202 access to covered parking location 204. Barricade 205 may be coupled to access terminal 206 such that access terminal 206 may control the actuation of barricade 205. In other embodiments, barricade may be in communication with a CPL computing device (e.g., CPL computing device 120, shown in FIG. 1) such that the CPL computing device may transmit a signal to barricade 205 to signal barricade 205 to actuate.

Access terminal 206 may be configured to receive input from a vehicle user (not shown) of vehicle 202 and/or a vehicle computing device (e.g., vehicle computing device 110, shown in FIG. 1) associated with vehicle 202. In at least one embodiment, the vehicle computing device may communicate an access code via an NFC interface to access terminal 206. Access terminal may verify that vehicle 202 may park in covered parking location 204 (i.e., parking spots in covered parking location 204 are available and/or the vehicle computing device may have reserved a parking spot). In one embodiment, access terminal may print a ticket, card, or pass for the vehicle user. When vehicle 202 leaves, the vehicle user may present the ticket to access terminal 206 or another access terminal not shown to actuate barricade 205 or another barricade not shown. In some embodiments, access terminal 206 may prompt the vehicle user to enter payment information to pay for the parking spot. In other embodiments, payment may be automatically withdrawn from a payment account (e.g., a credit account or a bank account) when the user presents the ticket to access terminal 206.

Exemplary Residential Covered Parking Location

Figure 3:
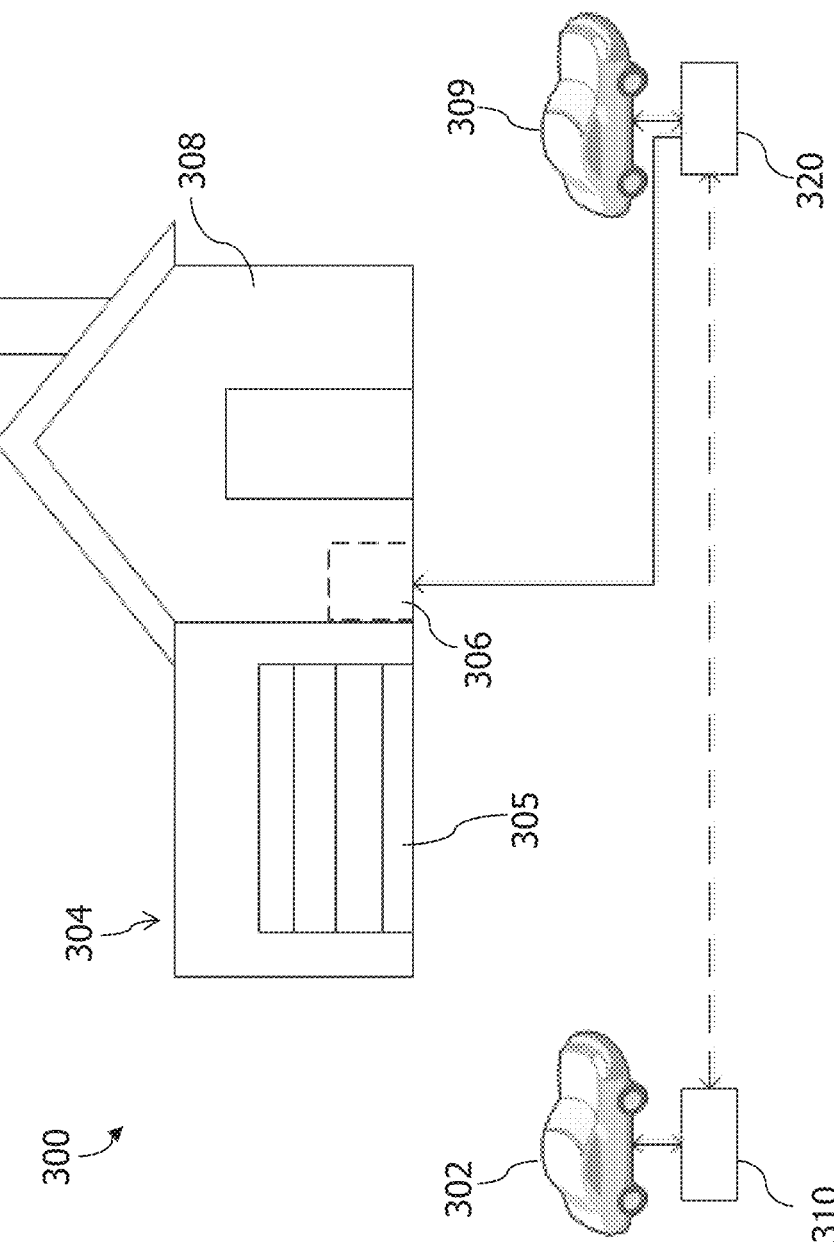
FIG. 3 illustrates an exemplary vehicle weather damage-prevention system similar to the system shown in FIG. 1 that may include a residential covered parking location.

FIG. 3 illustrate an exemplary vehicle weather damage-prevention system 300 that may include a residential covered parking location 304. In the absence of contrary representation, system 300 may be similar to system 100 shown in FIG. 1. System 300 may include a first vehicle 302, covered parking location 304, a barricade 305, an access terminal 306, an infrastructure 308, a second vehicle 309, a vehicle computing device 310, and/or a CPL computing device 320. System 300 may include additional, fewer, or alternate components, including those discussed elsewhere herein.

In the exemplary embodiment, covered parking location 304 may be a residential garage attached to infrastructure 308, which may be a residential house. A home owner or occupant of infrastructure 308 may rent or otherwise provide covered parking location 304 for vehicles such as first vehicle 302. Covered parking location 304 may include barricade 305. In the illustrated embodiment, barricade 305 may be a garage door. In some embodiments, covered parking location 304 may include one or more doors to provide a vehicle user an entry and/or exit to covered parking location 304. Access terminal 306 may be stored and/or integrated into covered parking location 304 and/or infrastructure 308. Access terminal 306 may be configured to, for example, communicate with CPL computing device 320, verify first vehicle 302, and/or manipulate barricade 305. In at least some embodiments, access terminal 306 may be configured to lock any windows, doors, and/or other entryways to infrastructure 308. Access terminal 306 may be further configured to automatically activate a security system of infrastructure 308.

In some embodiments, CPL computing device 320 may be remote from covered parking location 304. In the illustrated embodiment, CPL computing device 320 may be a computing device installed in second vehicle 309 or a mobile device of a vehicle user of second vehicle 309. CPL computing device 320 may be in communication with access terminal 306 and/or vehicle computing device 310. In some embodiments, CPL computing device may transmit a signal to access terminal 306 and/or barricade 305 to actuate barricade 305. In other embodiments, CPL computing device transmits an access code to access terminal 306 and/or vehicle computing device 310.

Exemplary User Computing Device

Figure 4:
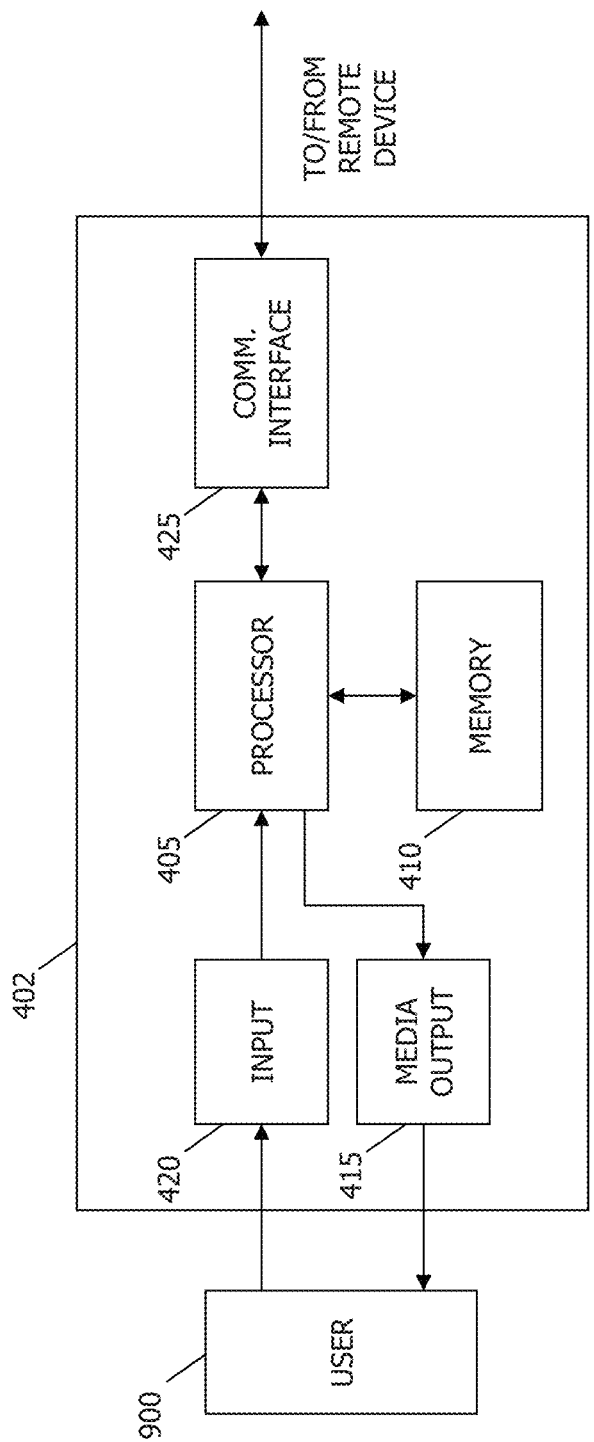
FIG. 4 illustrates an exemplary computing system that may be used in a vehicle weather damage-prevention system, such as the system shown in FIG. 1.

FIG. 4 depicts an exemplary configuration of a user or remote computing device 402. Computing device 402 may include, but is not limited to, access terminal 106, vehicle computing device 110, CPL computing device 120, and/or insurance computing device 130 shown in FIG. 1. Computing device 402 may also include access terminal 206 shown in FIG. 2, access terminal 306, vehicle computing device 310, and/or CPL computing device 320 shown in FIG. 3.

Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 815 for presenting information to a user 900. Media output component 415 may be any component capable of conveying information to user 900. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 900.

In some embodiments, computing device 402 may include an input device 420 for receiving input from user 900. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device such as insurance computing device 130 (shown in FIG. 1). Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 900 via media output component 415 and, optionally, receiving and processing input from input device 420. A user interface may include, among other possibilities, a web browser and client application. Web browsers enable users 900 to display and interact with media and other information typically embedded on a web page or a website from a web server associated with a merchant. A client application allows users 900 to interact with a server application associated with, for example, a vendor or business.

Exemplary Host Computing Device

Figure 5:
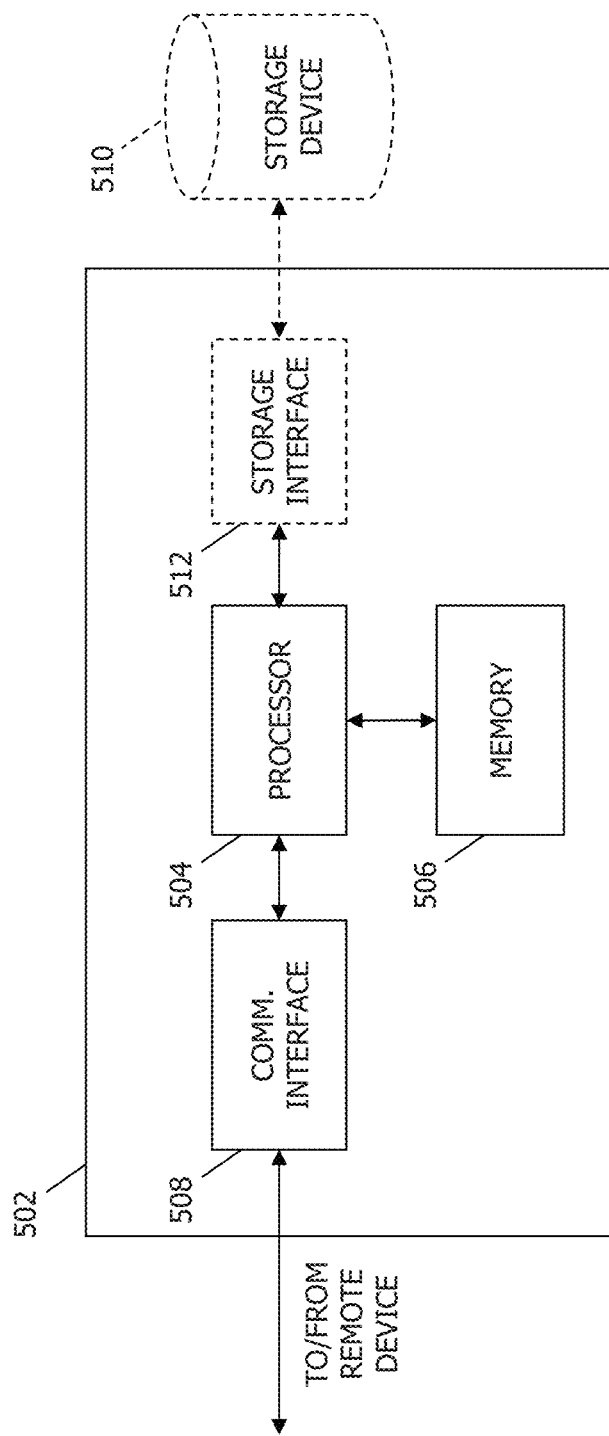
FIG. 5 illustrates an exemplary host computing system that may be used in a vehicle weather damage-prevention system, such as the system shown in FIG. 1.

FIG. 5 depicts an exemplary configuration of a host computing device 502. Host computing device 502 may be representative of vehicle computing device 110, CPL computing device 120, and/or insurance computing device 130 (all shown in FIG. 1). In some embodiments, host computing device 502 may be a remote computing device relative to other computing devices. Host computing device 502 may include a processor 504 for executing instructions. Instructions may be stored in a memory area 506, for example. Processor 504 may include one or more processing units (e.g., in a multi-core configuration).

Processor 504 may be operatively coupled to a communication interface 508 such that host computing device 502 may be capable of communicating with a remote device such as computing device 402 shown in FIG. 4 or another host computing device 502. For example, communication interface 508 may receive requests from user computing device 402 via the Internet.

Processor 504 may also be operatively coupled to a storage device 510. Storage device 510 may be any computer-operated hardware suitable for storing and/or retrieving data. In some embodiments, storage device 510 may be integrated in host computing device 502. For example, host computing device 502 may include one or more hard disk drives as storage device 510. In other embodiments, storage device 510 may be external to host computing device 502 and may be accessed by a plurality of host computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 may be operatively coupled to storage device 510 via a storage interface 512. Storage interface 512 may be any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Computer-Implemented Method for Identifying Covered Parking Locations

Figure 6:
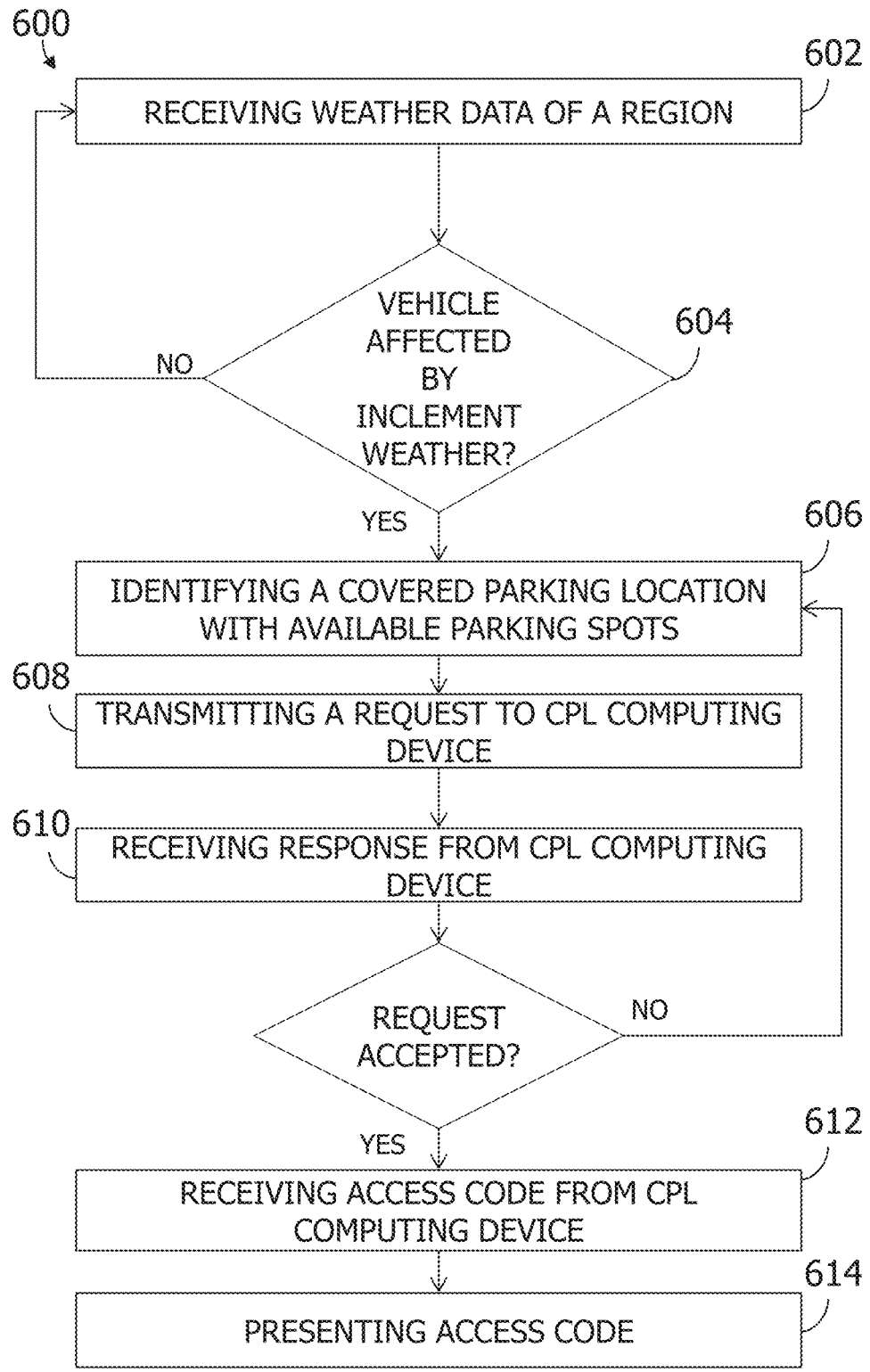
FIG. 6 illustrates an exemplary computer-implemented method for identifying covered parking locations during inclement weather, where the method may be implemented by a vehicle weather damage-prevention system, such as the system shown in FIG. 1.

FIG. 6 depicts an exemplary computer-implemented method 600 for identifying covered parking locations during inclement weather. Method 600 may be implemented by a vehicle weather damage-prevention system, such as system 100 shown in FIG. 1 and system 300 shown in FIG. 3. Method 600 may include additional, fewer, or alternate actions, including those discussed elsewhere herein. In the exemplary embodiment, method 600 may be at least partially implemented by a vehicle computing device. Method 600 may be implemented via various local or remote processors, and/or computer-executable instructions stored on non-transitory computer-readable media or medium.

Method 600 may begin with the vehicle computing device receiving 602 weather data of a region that may include a vehicle associated with the vehicle computing device. In some embodiments, the vehicle computing device may further receive a weather warning indicating inclement weather conditions, such as via wireless communication or data transmission. Additionally or alternatively, the vehicle computing device may generate weather condition scores indicative of the likelihood of inclement weather. The vehicle computing device may determine 604 whether the vehicle may be affected by inclement weather that may cause, for example, damage to the vehicle. Determining 604 may include, for example, identifying inclement weather conditions based upon the weather data and/or the weather warning. Additionally or alternatively, determining 604 may include receiving user input based upon the weather data and/or the weather warning. If the vehicle computing device determines 604 that the vehicle may not be affected by inclement weather, the vehicle computing device may continue to receive 602 weather data.

If the vehicle computing device determines 604 that the vehicle may be affected by inclement weather, the vehicle computing device may identify 606 a covered parking location with at least one available parking spot. In some embodiments, the vehicle computing device may receive a location identifier and a communication address associated with each covered parking location within a certain distance from the vehicle and/or the vehicle computing device. The distance is determined based upon the location of the vehicle and the location identifier. In at least one embodiment, the vehicle computing device may use the communication addresses associated with the covered parking locations to contact one or more CPL computing devices that may be configured to indicate any available parking spots to the vehicle computing device. The CPL computing devices may further be configured to indicate additional information, such as a capacity of the covered parking location, a type of parking location (e.g., residential or commercial) and/or payment information for parking spots. The vehicle computing device may select a particular covered parking location based upon, for example, user input, distance from the vehicle, type of covered parking location, the price of parking at the covered parking location, and/or proximity of the covered parking location to a location associated with the vehicle user (e.g., the vehicles user's work location).

The vehicle computing device may transmit 608 a request to reserve a parking spot to the CPL computing device associated with the selected covered parking location. In some embodiments, the vehicle computing device may transmit additional information such as payment information and/or a vehicle user profile to the CPL computing device. Additionally or alternatively, the CPL computing device may receive the payment information and/or the vehicle user profile from a different computing device. The vehicle computing device may receive 610 a response from the CPL computing device indicating whether vehicle is granted or denied access to the covered parking location. If the vehicle computing device receives 610 a response indicating the vehicle is denied, the vehicle computing device may continue to identify 606 other covered parking locations or exit method 600.

If the vehicle computing device receives 610 a response indicating the vehicle is accepted, the vehicle computing device may receive 612 an access code to be presented at the covered parking location to access the covered parking location. The vehicle computing device may present 614 the access code to the CPL computing device, an access terminal, a barricade, and/or any other component or computing device configured to permit the vehicle access into the covered parking location. In some embodiments, the vehicle computing device may be in communication with the CPL computing device to indicating the vehicle is near the covered parking location such the CPL computing device may provide a signal to the covered parking location (e.g., the access terminal) to permit the vehicle access. The vehicle may be parked in the covered parking location to avoid inclement weather.

Exemplary Computer-Implemented Method for Providing Covered Parking to Vehicles

Figure 7:
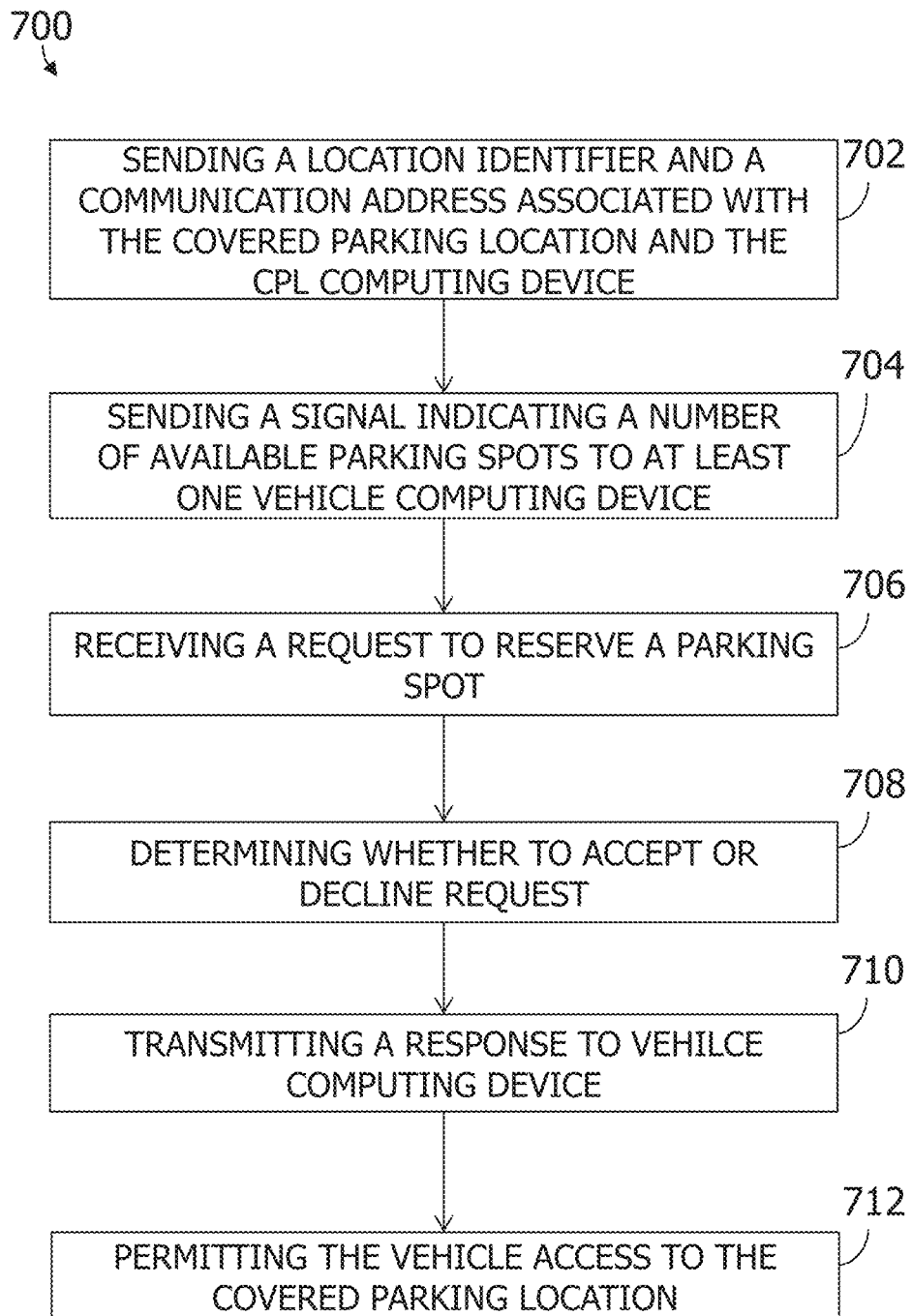
FIG. 7 illustrates an exemplary computer-implemented method for providing covered parking for vehicles during inclement weather, where the method may be implemented by a vehicle weather damage-prevention system, such as the system shown in FIG. 1.

FIG. 7 depicts an exemplary computer-implemented method 700 for providing covered parking for vehicles during inclement weather. Method 700 may be implemented by a vehicle weather damage-prevention system, such as system 100 shown in FIG. 1 and system 300 shown in FIG. 3. Method 700 may include additional, fewer, or alternate actions, including those discussed elsewhere herein. In the exemplary embodiment, method 700 may be at least partially implemented by a CPL computing device. Method 700 may be implemented via various local or remote processors, and/or computer-executable instructions stored on non-transitory computer-readable media or medium.

Method 700 may begin with the CPL computing device sending 702 a location identifier and a communication address associated with a covered parking location and the CPL computing device to a vehicle computing device, an insurance computing device, and/or another computing device. A vehicle computing device may receive the location identifier and the communication address from the CPL computing device, the insurance computing device, and/or the other computing device to determine the distance between a vehicle and the covered parking location and contact the CPL computing device. When a vehicle computing device contacts the CPL computing device, the CPL computing device may send 704 a signal to the vehicle computing device indicating a number of available parking spots of the covered parking location associated with the CPL computing device. In some embodiments, the signal may further indicate other information about the covered parking location, such as, but not limited to, payment information for parking spots, a total number of parking spots, an address of the covered parking location, the type of covered parking location (e.g., residential garage, commercial parking, etc.), and/or distance from each vehicle computing device and/or the vehicle associated with each vehicle computing device.

The CPL computing device may receive 706 a request from a vehicle computing device to reserve a parking spot of the covered parking location. The request may further include, for example, payment information and/or a vehicle user profile. The CPL computing device may determine 708 whether to accept or decline the request. In some embodiments, the CPL computing device may include configurable settings such that the CPL computing device may automatically accept or decline the request. Additionally or alternatively, a user associated with the CPL computing device may accept or decline the request. The CPL computing device may transmit 710 a response to the vehicle computing device. In certain embodiments, if the vehicle is denied, the CPL computing device may block any further communication with the vehicle computing device for at least a portion of time (e.g., a day, a week, a month, until the inclement weather may have passed, etc.).

If the CPL computing device accepts the request, the CPL computing device may permit 712 the vehicle access to the covered parking location. In the exemplary embodiment, the CPL computing device may transmit an access code to the vehicle computing device. In other embodiments, the CPL computing device may transmit a signal to a barricade, an access terminal, and/or another component or computing device configured to permit the vehicle access to the covered parking location. The CPL computing device may further send a signal to activate security measures at the covered parking location and/or an infrastructure associated with the covered parking location. The security measures may include, for example, locking doors, locking windows, and/or activating a security system.

The CPL computing device may receive a notification that the vehicle is parked in the covered parking location. In some embodiments, the CPL computing device may monitor the duration that the vehicle is parked in the covered parking location. In certain embodiments, the CPL computing device may monitor the covered parking location using sensors (e.g., motion sensors, cameras) installed at the covered parking location. A user associated with the CPL computing device may identify and report criminal and/or otherwise undesirable activity remotely. In some embodiments, the CPL computing device may receive a notification that the vehicle has exited the covered parking location. For monetized parking spots, the CPL computing device may process a transaction for the parking spot using payment information of the vehicle user. It is to be understood that the CPL computing device may process the transaction before, during and/or after the vehicle has parked in the covered parking location.

Exemplary Computer-Implemented Method for Providing Insurance-Related Benefits

Figure 8:
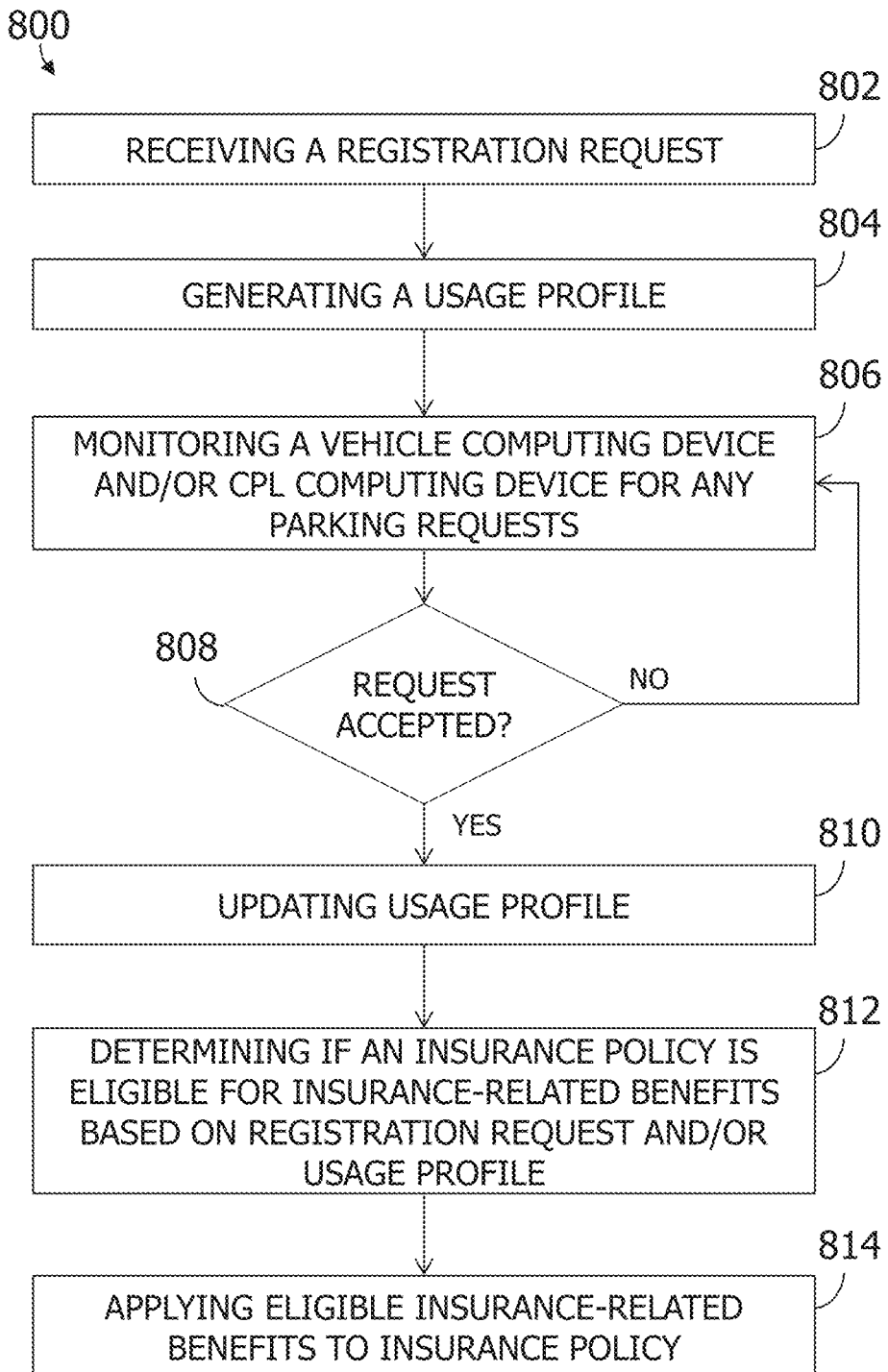
FIG. 8 illustrates an exemplary computer-implemented method for providing insurance-related benefits to insurance policies covering vehicles and/or covered parking locations, where the method may be implemented by a vehicle weather damage-prevention system, such as the system shown in FIG. 1.

FIG. 8 depicts an exemplary computer-implemented method 800 for providing insurance-related benefits to insurance policies associated with vehicles and/or covered parking locations. Method 800 may be implemented by a vehicle weather damage-prevention system, such as system 100 shown in FIG. 1 and system 300 shown in FIG. 3. Method 800 may include additional, fewer, or alternate actions, including those discussed elsewhere herein. In the exemplary embodiment, method 800 may be at least partially implemented by an insurance computing device. Method 800 may be implemented via various local or remote processors, and/or computer-executable instructions stored on non-transitory computer-readable media or medium.

Method 800 begins with the insurance computing device receiving 802 a registration request from a vehicle computing device associated with a vehicle and/or a CPL computing device associated with a covered parking location. In other embodiments, the insurance computing device may automatically monitor at least one vehicle computing device and/or CPL computing device as described herein. The registration request may include, for example, an insurance policy identifier associated with an insurance policy of the vehicle or covered parking location. The insurance computing device may store information associated with an insurance policy indicated by the insurance policy identifier, the vehicle or covered parking location, and/or the associated computing device (i.e., the vehicle computing device or the CPL computing device). In certain embodiments, the insurance computing device may receive and store a location identifier and a communication address for each covered parking location. In the exemplary embodiment, the insurance computing device may generate 804 a usage profile for the policyholder of the vehicle and/or the covered parking location.

In certain embodiments, the insurance computing device may receive weather data and/or weather warnings of one or more regions. The insurance computing device may determine the vehicle and/or vehicles near the covered parking location may be affected by inclement weather. The insurance computing device may monitor 806 the vehicle computing device or the CPL computing device for requests to reserve a parking spot. In certain embodiments, the insurance computing device may be configured to transmit location identifiers and communication addresses associated with covered parking locations near a vehicle and/or a vehicle computing device to the vehicle computing device. In some embodiments, the insurance computing device may transmit and/or receive information to and/or from the vehicle computing device and/or the CPL computing device, such as a vehicle user profile, covered parking locations with available parking spots, payment information, and/or the usage profile.

If the insurance computing device identifies a request from a registered vehicle computing device, the insurance computing device may determine 808 whether the request is accepted or denied. In addition, if the request is accepted, the insurance computing device may determine whether the vehicle parks in the covered parking location. For registered CPL computing devices that receive a request, the insurance computing device may determine 808 whether the CPL computing device accepts or denies the request. In addition, the insurance computing device may determine whether accepted vehicles parked in the covered parking location. The insurance computing device updates 810 the usage profile for the vehicle or the covered parking location. The usage profile may indicate, for example, but is not limited to, the number of inclement weather conditions affecting the vehicle or covered parking location, the type of inclement weather, the number of requests, the number of accepted requests, the number of rejected requests, how often a vehicle parks in a covered parking location, peer reviews, and/or payment information.

In the exemplary embodiment, the insurance computing device may determine 812 whether the insurance policy is eligible for insurance-related benefits as described above. Determining 812 may be based upon the registration request and/or the usage profile of the vehicle computing device or the CPL computing device. For example, a vehicle and an associated vehicle computing device that frequently request and use covered parking spots during inclement weather may be eligible for insurance-related benefits. A covered parking location and an associated CPL computing device that reject most requests for covered parking may be eligible for less insurance-related benefits or may not be eligible at all. The insurance computing device may apply 814 any eligible insurance-related benefits to the insurance policy. In some embodiments, a user associated with the vehicle computing device or the CPL computing device may accept or decline the insurance-related benefits. In the exemplary embodiment, the insurance computing device may notify the vehicle computing device and/or the CPL computing device if an insurance-related benefit has been applied to the insurance policy.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An insurance computing device comprising a processor and a memory, wherein the processor is programmed to:
   receive a registration request from a vehicle computing device associated with a vehicle and a covered parking location (CPL) computing device associated with a covered parking location;
   register the vehicle computing device and the CPL computing device, wherein registering the vehicle computing device includes identifying the vehicle and an insurance policy associated with the vehicle;
   generate a usage profile associated with the vehicle and a usage profile associated with the covered parking location, wherein the usage profile associated with the vehicle includes a frequency of the vehicle being affected by inclement weather and a frequency of the vehicle being parked at a protected parking location during inclement weather, and wherein the usage profile associated with the covered parking location includes a frequency of the covered parking location permitting one or more vehicles to park in the covered parking location during inclement weather;
   retrieve weather data of a region that includes the vehicle, the weather data including at least one of current weather data and predicted weather data;
   determine from the weather data that the region will experience inclement weather within a predetermined period of time;
   transmit information of one or more covered parking locations located nearby the vehicle, the one or more covered parking locations including the covered parking location;
   receive a notification message indicating whether access to the covered parking location was permitted to the vehicle and whether the vehicle parked in an available parking spot of the covered parking location; and
   update, based on the notification message, the usage profile associated with the vehicle and the usage profile associated with the covered parking location.

2. The insurance computing device of claim 1, wherein the processor is further programmed to apply eligible insurance-related benefits to the insurance policy associated with the vehicle.

3. The insurance computing device of claim 1, wherein the processor is further configured to:
   receive weather data of at least one region;
   determine from the weather data that a region including the vehicle will experience inclement weather; and
   identify that at least one of the vehicle and the covered parking location is affected by the inclement weather.

4. The insurance computing device of claim 1, wherein the registration request from the CPL computing device includes a location identifier of the covered parking location and a communication address of the CPL computing device.

5. The insurance computing device of claim 4, wherein the processor is further programmed to transmit at least one of the location identifier and the communication address to the vehicle computing device.

6. The insurance computing device of claim 1, wherein the registration request from the vehicle computing device includes a vehicle user profile.

7. The insurance computing device of claim 6, wherein the processor is further programmed to transmit the vehicle user profile to the CPL computing device when the CPL computing device receives a request to reserve the available parking spot of the covered parking location.

8. The insurance computing device of claim 1, wherein the usage profile associated with the vehicle indicates a frequency of the vehicle computing device requesting to park at covered parking locations during inclement weather.

9. The insurance computing device of claim 1, wherein the usage profile associated with the vehicle indicates a frequency of the vehicle being parked in covered parking locations when a request to reserve a parking spot is approved.

10. The insurance computing device of claim 1, wherein the usage profile associated with the covered parking location indicates a frequency in which the CPL computing device associated with the covered parking location receives one or more requests to park at the covered parking location during inclement weather.

11. The insurance computing device of claim 1, wherein the usage profile associated with the covered parking location indicates a frequency in which the CPL computing device associated with the covered parking location approves one or more requests to park at the covered parking location.

12. A computer-implemented method for identifying a covered parking location, the method implemented using a vehicle computing device associated with a vehicle, the method comprising:
 transmitting, from the vehicle computing device to an insurance computing device, a registration request requesting that the insurance computing device register the vehicle with the insurance computing device as a possible vehicle requiring a protected parking location during inclement weather;
 receiving, in response to the registration request, a registration confirmation of the vehicle from the insurance computing device, wherein the registration confirmation includes an identification of an insurance policy associated with the vehicle and generation of a usage profile associated with the vehicle, wherein the usage profile includes a frequency of the vehicle being affected by inclement weather;
 receiving, by the vehicle computing device, weather data of a region that includes the vehicle, the weather data including at least one of current weather data and predicted weather data;
 determining from the weather data that the region will experience inclement weather within a predetermined period of time;
 receiving information of one or more covered parking locations located nearby the vehicle, the one or more covered parking locations located nearby the vehicle including the covered parking location;
 identifying the covered parking location, wherein the covered parking location includes an available parking spot;
 transmitting, by the vehicle computing device, a request to reserve the available parking spot to a CPL computing device associated with the covered parking location; and
 receiving, by the vehicle computing device, a notification message granting access to the covered parking location for the vehicle.

13. The computer-implemented method of claim 12, wherein receiving the notification message granting access to the covered parking location includes receiving an access code.

14. The computer-implemented method of claim 13, wherein the access code is at least one of a text code, a quick recognition (QR) code, a biometric code, a bar code, a radio frequency identification (RFID) code, an audible code, and an electronic token.

15. The computer-implemented method of claim 13, further comprising presenting the access code to an access terminal of the covered parking location, wherein presenting the access code causes a barricade of the covered parking location to actuate from a closed position to an open position.

16. The computer-implemented method of claim 12, wherein identifying the covered parking location further comprises:
 receiving a location identifier and a communication address associated with the covered parking location and the CPL computing device;
 determining that the covered parking location is within a predefined distance from the vehicle based upon the location identifier;
 communicate with the CPL computing device in response to determining the covered parking location is within the predefined distance using the communication address; and
 receiving information about the covered parking location from the CPL computing device, the information about the covered parking location including a number of available parking spots.

17. The computer-implemented method of claim 16, wherein the location identifier and the communication address are received from at least one of the CPL computing device, the insurance computing device, and a remote computing device.

18. The computer-implemented method of claim 16, wherein the information about the covered parking location further includes at least one of a price to park in the covered parking location, a capacity of the covered parking location, and a type of the covered parking location.

19. The computer-implemented method of claim 12, further comprising:
 transmitting the registration request to the insurance computing device, the registration request including an insurance policy identifier associated with the vehicle, wherein the insurance computing device is configured to generate a usage profile associated with a policyholder of the vehicle; and
 receiving, from the insurance computing device, a notification indicating that an insurance-related benefit is applied to the insurance policy associated with the insurance policy identifier based upon the usage profile associated with the policyholder of the vehicle.

20. The computer-implemented method of claim 19, wherein the usage profile indicates a frequency in which the vehicle computing device locates a covered parking location during inclement weather.

* * * * *